3,283,676
CEMENT FINISHING MACHINE
Russell G. Sumter, Tulsa, Okla., assignor, by direct and mesne assignments, to O. R. Carpenter, Tulsa, Okla.
Filed Dec. 23, 1963, Ser. No. 332,367
11 Claims. (Cl. 94—48)

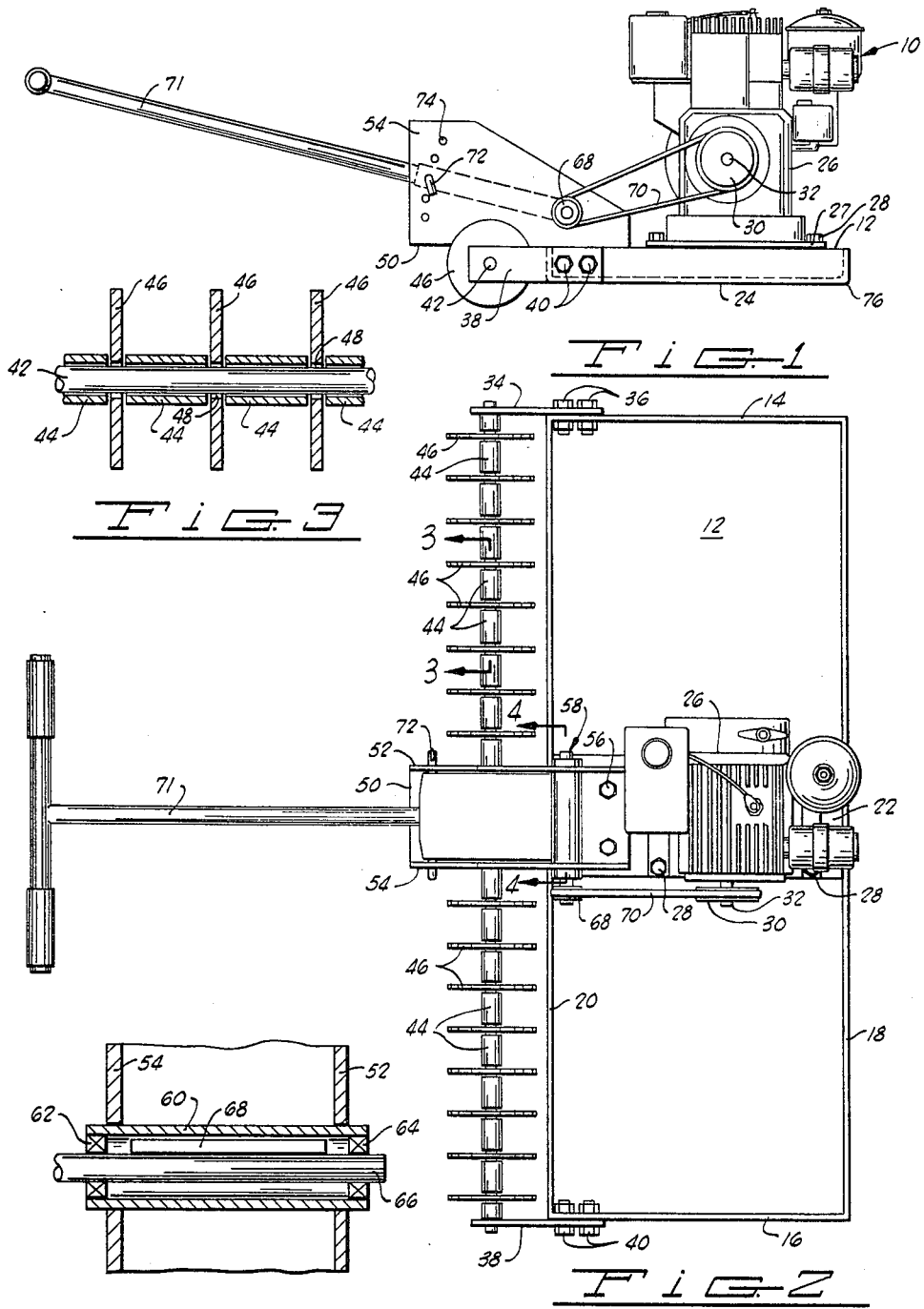

This invention relates generally to machines useful in working unset or plastic concrete. More particularly, but not by way of limitation, this invention relates to hand opearted vibratory type machines useful in working unset concrete.

Various types of machines have been constructed in the past for the purpose of finishing plastic concretes, but none have been entirely successful. The need for such machines has arisen due to the desirability of maintaining the water-cement ratio in the concrete as low as possible. The lower the ratio of the volume of water to the volume of cement present, as long as the mix is workable, the higher will be the strength of the resulting concrete. For example, plain concrete samples, each having similar aggregates, exhibited the following compressive strengths after twenty-eight days setting time:

(1) A ratio of 5 gallons of water per bag of cement yielded a compressive strength of 4,000 pounds per square inch;
(2) A ratio of 5.5 gallons of water per bag of cement yielded a compressive strength of 3,500 pounds per square inch;
(3) A ratio of 6 gallons of water per bag of cement yielded a compressive strength of 3,000 pounds per square inch;
(4) A ratio of 6.5 gallons of water per bag of cement yielded a compressive strength of 2,500 pounds per square inch;
(5) A ratio of 7.5 gallons of water per bag of cement yielded a compressive strength of 2,000 pounds per square inch; and,
(6) A ratio of 8 gallons of water per bag of cement yielded a compressive strength of 1,500 pounds per square inch. (The foregoing values were obtained from Table 11, page 672, fifth edition, Mechanical Engineering Handbook, by Marx.)

As mentioned above, the high strength of the dry cement is highly desirable, but it is necessary that the mix be workable to assure that no voids exist, particularly in the area of coarse aggregate. Also, the mix must be workable in order to make sure that a smooth surface can be obtained on the concrete by moving the coarse aggregate downwardly and bringing the fine aggregate and cement to the surface.

One machine constructed in an effort to accomplish the foregoing provided a vibration type device mounted on a relatively smooth plate. As the plate and vibrator are moved over the surface of the concrete, a leveling effect is obtained. However, the machine has only a moderate degree of success in moving the coarse aggregate toward the bottom of the cement and bringing the fine aggregate to the surface. The vibrations imparted by the plate to the concrete have a tendency to make the concrete more workable.

Another machine constructed in an attempt to accomplish the foregoing also included a plate having a vibrator mounted thereon, but in addition included four resilient finger members which extended from the bottom of the plate into the concrete. The purpose of the finger members was to impart a vibration to the interior of the concrete. Such vibration aided in eliminating any voids existing in the relatively dry concrete and, of course, aided in moving the coarse aggregate to the bottom. The long fingers extending into the concrete has the disadvantage of making it extremely difficult to move the machine over the surface of the concrete. After deep agitation was obtained by the vibrating fingers, it was necessary to remove the fingers from the machine and run the smooth plate with the vibrator over the surface of the concrete to obtain the surface finish.

The foregoing disadvantages are obviated by this invention which generally contemplates a concrete finishing machine including a base member having a relatively smooth lower surface to accomplish the smoothing and leveling of the concrete. It also includes a plurality of discs that are rotatably positioned on the base member and are arranged to extend below the base member into the concrete. A vibrator is mounted on the base member in such a position as to cause both the base member and the discs to vibrate, whereby the surface of the concrete is leveled; the coarse aggregate is caused to move toward the bottom of the concrete, and the fine aggregate and cement move toward the surface thereof.

One object of the invention is to provide an improved concrete finishing machine that is easily and economically manufactured.

Another object of the invention is to provide an improved concrete machine that will permit the use of concrete having low water-cement ratios.

A further object of the invention is to provide an improved concrete finishing machine that will vibrate the concrete internally to assure the absence of voids while using low water-cement ratio concrete and yet, can be easily moved through the concrete.

A still further object of the invention is to provide an improved concrete finishing machine that will vibrate the concrete internally and will smooth the surface of the concrete.

The foregoing and additional objects and advantages of the invention will become more apparent as the following description is read in conjunction with the accompanying drawing wherein like reference characters denote like parts in all views and wherein:

FIGURE 1 is a side elevation view of a concrete finishing machine constructed in accordance with the invention;

FIGURE 2 is a top view of the finishing machine shown in FIGURE 1;

FIGURE 3 is an enlarged cross sectional view taken along the line 3—3 of FIGURE 2 and illustrating the arrangement of a pair of disc members, tubular spacer members and the shaft upon which they are mounted; and, FIGURE 4 is an enlarged cross sectional view taken along the line 4—4 of FIGURE 2, and illustrating the structure of a vibrator assembly.

Referring now to the drawing, and to FIGURES 1 and 2 in particular, shown therein is a concrete finishing machine, generally designated by the reference character 10. The finishing machine 10 includes a base member 12 which has, in the preferred form, upturned end portions 14 and 16 and upturned edge portions 18 and 20 forming a peripheral flange extending around the base member 12. A mounting plate 22 extends transversely across the medial portion of the base member 12 between the edge portions 18 and 20. The mounting plate 22 is spaced vertically above the lower surface 24 (see FIGURE 1) of the base member 12. A gasoline engine 26 is shown mounted on the mounting plate 22 of the base member 12 by means of the bolts 28. A pad 27 is placed between the engine 26 and the base member 12.

While a gasoline engine 26 is illustrated, it should be apparent that any suitable driving means, such as an electric motor, could be used in place of the gasoline engine 26. A drive pulley 30 is illustrated as being mounted on the output shaft 32 of gasoline engine 26.

The purpose of the drive pulley 30 will be explained more fully hereinafter.

As shown in FIGURE 2, a pair of rearwardly extending bracket members 34 and 38 are mounted on the upturned end portions 14 and 16, respectively, of the base member 12 by bolts 36 and 40. A shaft 42, which is more clearly shown in FIGURE 3, extends between the bracket members 34 and 38. A plurality of tubular spacer members 44 are disposed along the shaft 42. A plurality of discs 46, each having a central opening 48 extending therethrough, are rotatably disposed along the shaft 42 between the spacer members 44.

As can be more clearly seen in FIGURE 3, the total combined length of the spacer members 44 and the discs 46 is less than the length of the shaft 42 between the bracket members 34 and 38 so that some longitudinal movement along the shaft 42 can occur. The spacer members 44 may be fixed to the shaft 42 with spaces therebetween wider than the thickness of the discs 46 so that the discs 46 may move longitudinally. However, the spacer members 44 may be loosely disposed on the shaft 42, if desired, and the discs 46 will move longitudinally on the shaft 42. It can also be observed in FIGURE 3, that the openings 48 in the discs 46 are slightly larger than the outside diameter of the shaft 42. The provision of this clearance permits the discs 46 to wobble slightly on the shaft 42 for purposes which will be more fully explained hereinafter.

Also mounted on the mounting plate 22 of the base member 12 is a generally U-shaped bracket 50 providing a pair of upstanding, spaced apart members 52 and 54. The U-shaped bracket 50 is mounted on the mounting portion 22 by means of bolts 56 which can be seen in FIGURE 2. Shown extending through the forward portion of the U-shaped bracket 50 is a vibrator assembly generally designated by reference character 58. The vibrator assembly 58 is shown more clearly in FIGURE 4. As shown therein, the vibrator assembly 58 includes a tubular member 60 extending through the upstanding members 52 and 54 of the U-shaped bracket 50. A pair of bearing members 62 and 64 are positioned in the tubular member 60 to rotatably position a vibrator shaft 66 therein. The vibrator shaft 66 includes an eccentric portion 68 located between the bearings 62 and 64 within the tubular member 60. As can be seen in FIGURE 2, one end of the vibrator shaft 66 is provided with a drive pulley 68 which is aligned with the drive pulley 30 mounted on the engine output shaft 32. A V-belt 70, or any suitable driving member, extends between the pulleys 30 and 68 whereby rotation of the output shaft 32 of the engine 26 is transmitted to the eccentric shaft 66.

An operating handle 71 is secured between the upstanding members 52 and 54 and extends away from the device, usually for several feet. The handle is adjustably secured by a pin 72 extending through holes 74 in the members 52 and 54 and through the handle 71. It will be noted that several vertically spaced holes 74 are provided.

Operation

After deposit of the concrete, or while it is being deposited, the concrete finishing machine 10, with the engine 26 running, is pushed by means of the handle 71 across the surface of the concrete. The finishing machine 10 is tilted so that the discs 46 extend into the concrete and the forward portion 76 of the lower surface 24 of the base member 12 is elevated above the surface of the concrete. With the finishing machine 10 in this position, the discs 46 enter the concrete to the maximum depth and, due to the high speed rotation of the vibrator 58, the discs 46 will be vibrated as the finishing machine 10 is moved across the concrete. The vibration of the discs 46, which deeply penetrate the concrete, results in the minimizing of voids and in the movement of the coarse aggregate toward the bottom of the concrete. Simultaneously, that portion of the lower surface 24 of the base member 12 which is in engagement with the surface of the concrete will, at least to some extent, level and smooth a portion of the concrete surface ahead of the disc 46.

As previously mentioned, the discs 46 fit loosely on the shaft 42. The loose fit permits the discs 46 to wobble as the finishing machine 10 is moved through the concrete thus preventing the coarse aggregate from sticking between adjacent discs 46.

The finishing stroke is accomplished by lifting the handle 71 so that the concrete finishing machine 10 is tilted at an angle reversed to that in the aforedescribed stroke. In this position, the forward portion 76 of the lower surface 24 of the base member 12 is in contact with the surface of the concrete, and the discs 46 are elevated to a position above the surface of the concrete. As the finishing machine 10 is drawn across the surface of the concrete, the high speed vibrations of the vibrator assembly 58, which are transmitted to the base member 12, tend to smooth the surface of the concrete and cause additional movement of the coarse aggregate toward the bottom of the cement and of the fine aggregate and cement toward the top surface of the concrete, resulting in a smooth finish. The foregoing described forward and back strokes are continued until the entire surface of the concrete reaches the desired smoothness.

It should be apparent from the foregoing description that the concrete finishing machine described herein provides a novel and highly effective apparatus for finishing the surface of concrete slabs or the like. It should also be apparent that the concrete finishing machine described herein provides means for vibrating the concrete internally, as well as providing a surface vibration, which combine to produce a relatively smooth surface. Due to the character of the vibration provided by the concrete finishing machine, it is possible to use cements with low water-cement ratios without the likelihood of voids in the finished concrete and with complete assurance that the desired surface can be produced.

It should be understood that the described embodiment is presented by way of example only, and that many changes and modifications can be made therein without departing from the spirit of the invention or from the scope of the annexed claims.

What I claim is:
1. In a concrete finishing machine:
   a base member having a substantially smooth lower surface;
   a plurality of spaced discs rotatably positioned along one edge of said base member and extending below the lower surface thereof; and,
   vibrator means operably connected with said base member and adapted to impart vibrations to said base member and discs.
2. The concrete finishing machine of claim 1, wherein said vibrator means includes:
   an eccentric member;
   means on said base member rotatably supporting said eccentric member; and
   driving means operably connected with said eccentric member.
3. In a concrete finishing machine:
   an elongated base member having a substantially smooth lower surface;
   a pair of brackets extending outwardly form said base member;
   a shaft extending between said brackets;
   a plurality of tubular spacer members disposed on said shaft;
   a plurality of discs rotatably positioned on said shaft and disposed in an alternating arrangement with said spacer members;
   said discs being sufficiently large in diameter to extend below the lower surface of said base member;
   an eccentric;

means on said base member for rotatably supporting said eccentric; and driving means mounted on said base member and operably connected with said eccentric.

4. A concrete finishing machine comprising:
a rectangular base member having a substantially smooth lower surface and having front and rear edges;
a pair of brackets mounted on said base member and extending rearwardly from the rear edge thereof;
a shaft extending between said brackets;
a plurality of tubular spacer members disposed on said shaft;
a plurality of discs having a centrally located bore of larger diameter than the diameter of said shaft; said discs being rotatably positioned on said shaft and disposed in alternating arrangement with said spacer members, the arrangement being such that the combined length of said spacer members and discs is less than the length of said shaft between said brackets;
a pair of upstanding, spaced apart members mounted on said base member;
a tubular member extending through and mounted in said spaced apart members;
an eccentric shaft journaled in said tubular member;
driving means mounted on said base member and operably connected with said eccentric shaft; and,
a handle secured to the base member.

5. In a concrete finishing machine:
an elongated base member having a lower surface;
a plurality of spaced discs loosely mounted on said base member for rotary and wobbling movements and extending below the lower surface thereof; and,
vibrator means operably connected with said base member and adapted to impart vibrations to said base member and discs.

6. The concrete finishing machine of claim 5, also including:
a shaft mounted on said base member and spaced apart therefrom;
said discs being rotatably located on said shaft; and,
a plurality of spacer members disposed on said shaft in alternating arrangement with said discs.

7. A concrete finishing machine comprising:
a rectangular base member having a lower plate portion, upturned edge and end portions forming a peripheral flange extending upwardly from said lower plate portion, and a mounting plate portion extending transversely across the medial portion of said base member above said lower plate portion;
a pair of brackets extending outwardly from said upturned end portions;
a shaft extending between said brackets and spaced apart from said base member;
a plurality of tubular spacer members loosely disposed on said shaft;
a plurality of discs rotatably positioned on said shaft and disposed in alternating arrangement with said spacer members;
vibrator means mounted on said mounting plate portion of said base member;
driving means mounted on said mounting plate portion and operably connected with said vibrator means; and,
a handle connected with said mounting plate portion of said base member.

8. The concrete finishing machine of claim 7 wherein said vibrator means includes:
a pair of upstanding, spaced apart members mounted on said mounting plate portion of said base member; and,
an eccentric shaft journaled in said spaced apart members.

9. The concrete finishing machine of claim 8, wherein said vibrator means also includes:
a tubular member extending through said spaced apart members; and,
journal means in said tubular member for rotatably supporting said eccentric shaft.

10. A concrete finishing machine comprising:
a rectangular base member having a lower plate portion, upturned end and edge portions forming a peripheral flange extending upwardly from said lower plate portion, and a mounting plate portion extending transversely across the medial portion of said base member above said lower plate portion;
a pair of brackets extending outwardly from said upturned end portions;
a shaft extending between said brackets;
a plurality of tubular spacer members loosely disposed on said shaft;
a plurality of discs rotatably positioned on said shaft and disposed in alternating arrangement with said spacer members, the arrangement being such that the combined length of said spacer members and discs is less than the length of said shaft between brackets;
a pair of spaced apart members mounted on said mounting plate portion of said base member;
a tubular member extending through said spaced apart members and fixed thereto;
an eccentric shaft journaled in said tubular member and having at least one end portion extending therefrom;
a pulley mounted on said end portion and rotatable therewith;
an engine having an output shaft mounted on said mounting plate portion;
a pulley mounted on said output shaft and rotatable therewith;
belt means operably extending between said pulleys adapted to transmit the rotation of said engine output shaft to said eccentric shaft, thereby imparting vibration to said base member and disc; and,
a handle connected with said spaced apart members.

11. A concrete finishing machine comprising:
a rectangular base member having a substantially smooth lower surface and having front and rear edges;
a pair of brackets mounted on said base and projecting outwardly therefrom;
a shaft extending between said brackets in spaced, generally parallel relationship to one of said edges;
a plurality of spaced discs rotatably disposed on said shaft, said discs extending below the lower surface of said base member;
an eccentric member;
means connected with said base member for rotatably supporting said eccentric member;
driving means mounted on said base member and operably connected with said eccentric shaft for operating siad eccentric to impart vibration to said base member and to said discs; and,
a handle connected with said base member.

References Cited by the Examiner

UNITED STATES PATENTS

| | | | |
|---|---|---|---|
| 1,934,550 | 12/1933 | McCree | 94—48 X |
| 2,224,506 | 12/1940 | Baily | 94—48 |
| 2,728,277 | 12/1955 | McRae | 94—48 |

JACOB L. NACKENOFF, *Primary Examiner.*

CHARLES E. O'CONNELL, *Examiner.*

N. C. BYERS, *Assistant Examiner.*